United States Patent [19]
Henion

[11] Patent Number: 5,971,554
[45] Date of Patent: Oct. 26, 1999

[54] MIRROR ASSEMBLY

[75] Inventor: Paul R. Henion, Fort Gratiot, Mich.

[73] Assignee: Britax Vision Systems (North America) Inc., Marysville, Mich.

[21] Appl. No.: 08/845,681

[22] Filed: Apr. 25, 1997

[51] Int. Cl.[6] .................................................. G02B 7/182
[52] U.S. Cl. ........................ 359/872; 359/871; 359/875; 359/214
[58] Field of Search ..................... 359/872, 871, 359/875, 214; 248/477, 479, 480, 481, 482

[56] References Cited

U.S. PATENT DOCUMENTS

| | | | |
|---|---|---|---|
| 4,318,590 | 3/1982 | Hanley | 359/214 |
| 4,640,142 | 2/1987 | Cummins et al. | 74/501 R |
| 5,031,871 | 7/1991 | Ohta et al. | 248/544 |
| 5,227,924 | 7/1993 | Kerper | 359/872 |
| 5,621,577 | 4/1997 | Lang et al. | 359/872 |

FOREIGN PATENT DOCUMENTS

| | | |
|---|---|---|
| 2090502 | 8/1993 | Canada. |
| 1532065 | 11/1978 | United Kingdom. |
| 2254832A | 10/1992 | United Kingdom. |

*Primary Examiner*—Cassandra Spyrou
*Assistant Examiner*—Mohammad Y. Sikder
*Attorney, Agent, or Firm*—Harness, Dickey & Pierce, P.L.C.

[57] ABSTRACT

An exterior rear view mirror for a motor vehicle of the breakaway design is disclosed which a mirror support member having a one piece integrally formed clamp mechanism for securing the mirror housing to the pivot post and in which the clamping pressure may be easily and conveniently adjusted without requiring removal of the mirror or its outer housing.

40 Claims, 3 Drawing Sheets

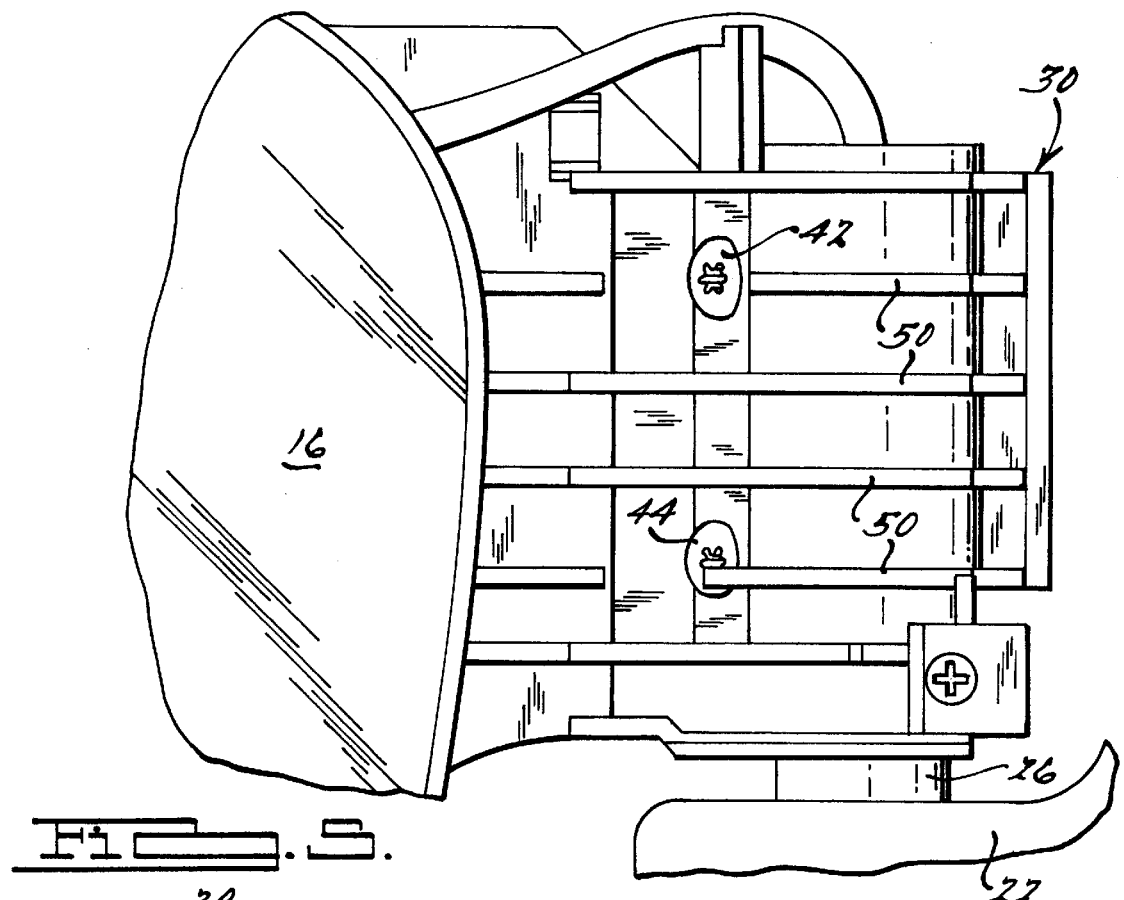
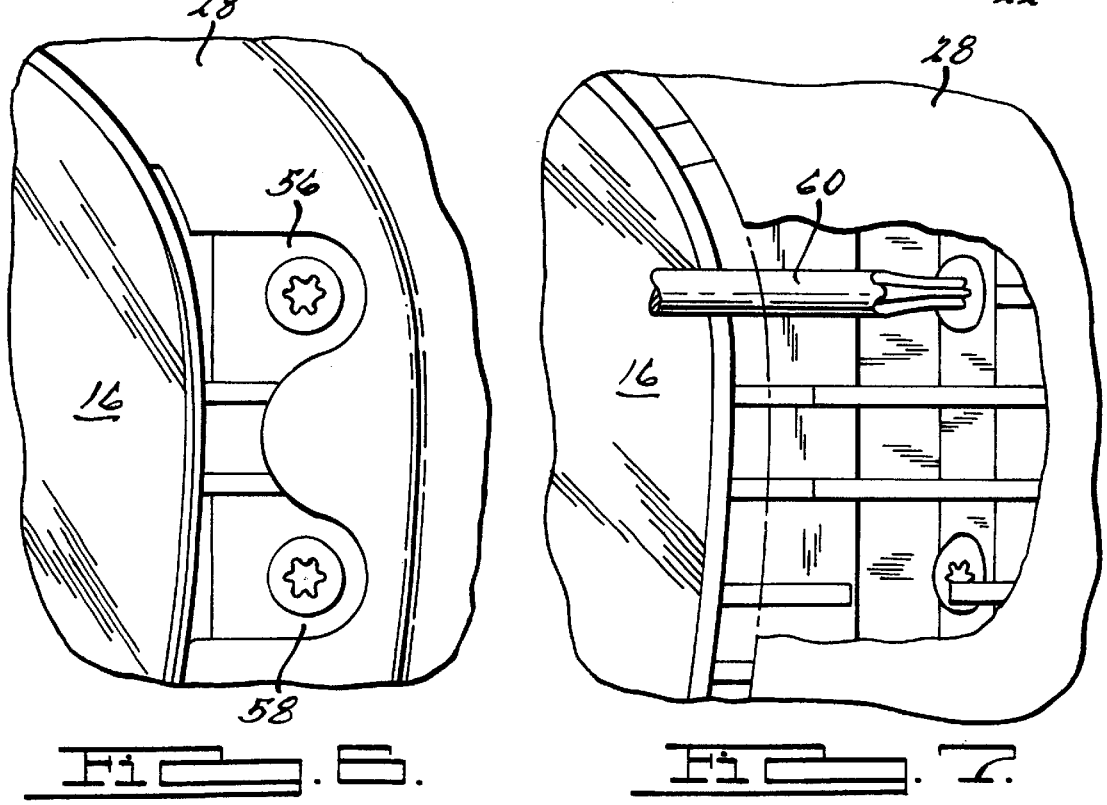

MIRROR ASSEMBLY

BACKGROUND AND SUMMARY OF THE INVENTION

The present invention relates generally to exterior rear view mirror assemblies and more specifically to such mirror assemblies of the so called breakaway design.

In recent years, motor vehicle manufacturers have incorporated exterior mirror assemblies in which the mirror is movably supported within a housing and the housing is pivotably supported on an upstanding post forming a part of a supporting base which base is in turn secured to the motor vehicle. Such designs offer significant advantages over prior exterior mirrors in that the housing protects the mirror from being bumped and moved out of adjustment by passerbys and the pivotable mounting allows the housing to fold backwardly or forwardly in the event it encounters an obstacle thus preventing damage to the mirror assembly. Typically, a spring loaded detent assembly is incorporated between the mirror housing and supporting base to retain the mirror in an operative position.

In order to inhibit any vibrational movement of the mirror assembly, it is important that the pivotable connection between the mirror housing (to which the mirror is secured) and the upstanding post of the supporting base be subjected to a predetermined desired claiming force. A typical manner of providing this clamping force has been to provide a semicircular seat on the mirror housing and a separate strap which is then secured to the mirror housing in overlying relationship to the upstanding post. Suitable threaded fasteners are normally used at opposite ends of the strap to secure it to the housing. While this arrangement provides a satisfactory clamping force when new, there is a tendency for the fasteners to loosen over time due to vibration, temperature cycling and the like. Because the fasteners securing the strap to the housing are generally concealed by an outer case and/or the mirror itself, tightening of the fasteners becomes a difficult and time consuming process requiring removal of the outer case and/or mirror itself. Additionally, the prior clamping arrangement is relatively costly in terms of assembling in that it requires separate fabrication, handling and installation of the strap and plurality of fasteners.

The present invention, however, overcomes the disadvantages of the prior clamping arrangement while still providing a strong, reliable, easily adjusted breakaway-type mounting arrangement for the mirror assembly. In the present invention, the fasteners utilized to provide the required clamping force are positioned within the outer case such that they are easily and conveniently accessible by merely tilting the mirror to an extreme inboard position. Once the fasteners have been adjusted, the mirror may be easily tilted back to its normal operative position in which the fasteners are substantially concealed thereby maintaining the aesthetically pleasing clean lines of the mirror assembly. Additionally, the clamping structure of the present invention is integrally formed with the mirror support frame thus eliminating the need to separately fabricate and assemble a strap member. Rather, only a suitable number of fasteners need be assembled to the support frame and tightened to the desired degree to secure the mirror housing to the upstanding post of the bracket frame. Thus, the mirror assembly of the present invention provides a breakaway mounting arrangement which offers the advantage of grater ease of serviceability while also incorporating a more efficient, less costly clamping arrangement while preserving the smooth aesthetically pleasing appearance and durability of the mirror assembly.

Additional advantages and features of the present invention will become apparent from the subsequent description and the appended claims taken in conjunction with the accompanying drawings.

BRIEF DESCRIPTION OF THE DRAWINGS

FIG. 5 is a fragmentary elevational view of the mirror assembly with the outer shell removed therefrom as seen looking forwardly from a rear position with respect to the motor vehicle, all in accordance with the present invention;

FIG. 6 is a fragmentary view of the mirror assembly of FIG. 3 as seen looking in the direction of arrow 6 shown in FIG. 3; and FIG. 7 is a fragmentary elevational view of the mirror assembly shown in FIGS. 1–3 with portions of the outer shell broken away.

DESCRIPTION OF THE PREFERRED EMBODIMENT

Figure 1:
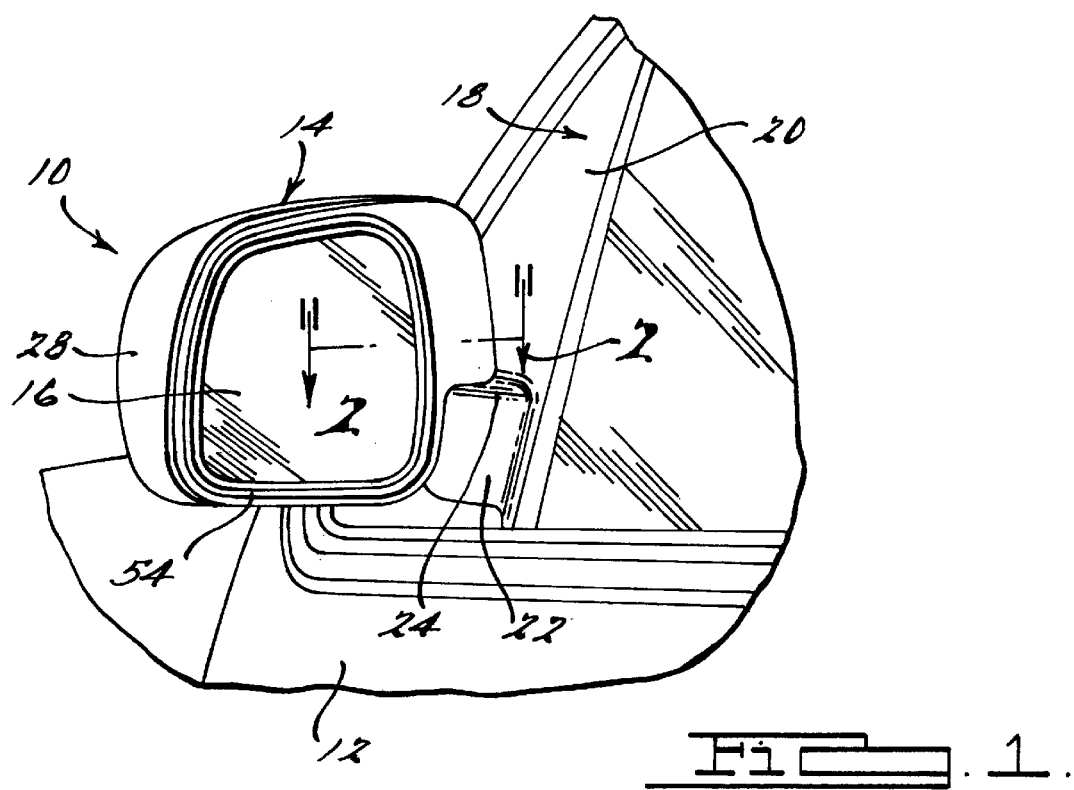
FIG. 1 is a perspective view of an exterior mirror assembly shown in operative installed relationship to a motor vehicle all in accordance with the present invention.

Referring now to the drawings and more specifically to FIG. 1, an exterior mirror assembly in accordance with the present invention indicated generally at 10 is shown in installed relationship to the door 12 of a motor vehicle. Mirror assembly 10 includes a mirror housing 14 within which a reflective mirror 16 is movably supported and a bracket frame 18 to which mirror housing 14 is pivotably mounted. As shown, bracket frame 18 includes a generally triangular shaped portion 20 by which mirror assembly 10 is secured to door 12 of a motor vehicle. A smoothly surfaced projection 22 extends outwardly from triangular shaped portion 20 of bracket frame 18 and defines a generally horizontal surface 24 from which a generally cylindrically shaped elongated pivot post 26 extends generally vertically upwardly.

Figure 2:
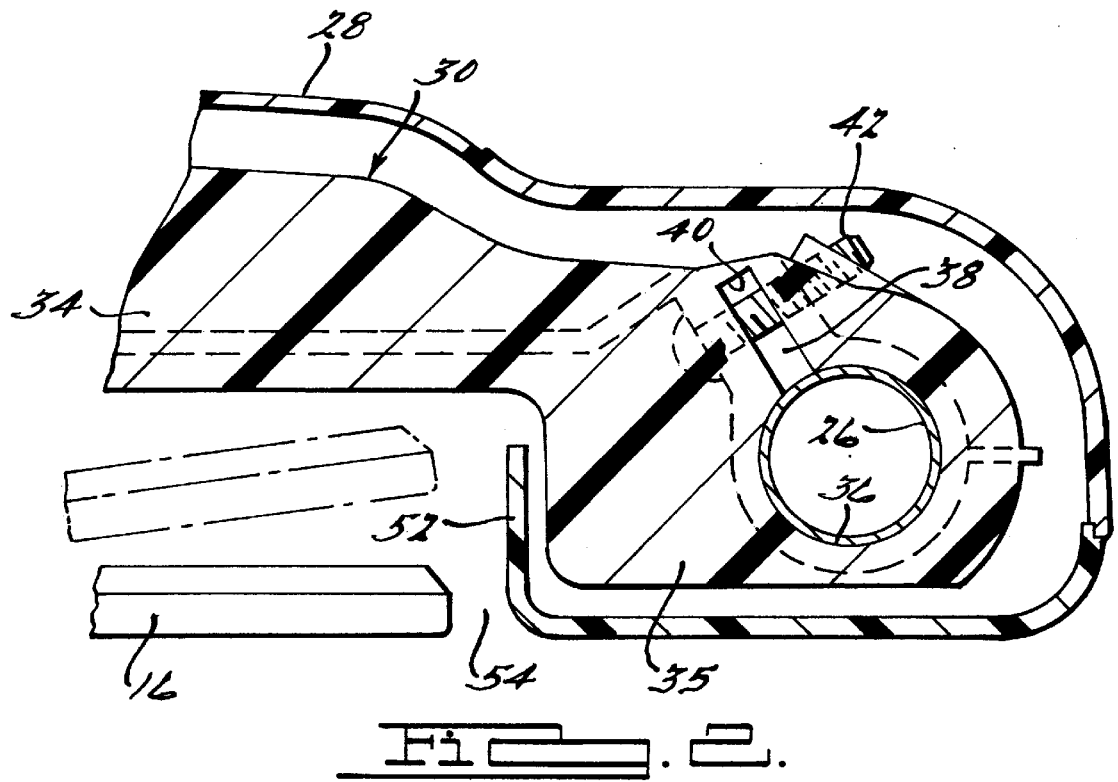
FIG. 2 is a fragmentary section view of the mirror assembly of FIG. 1, the section being taken along line 2—2 thereof.
Figure 3:
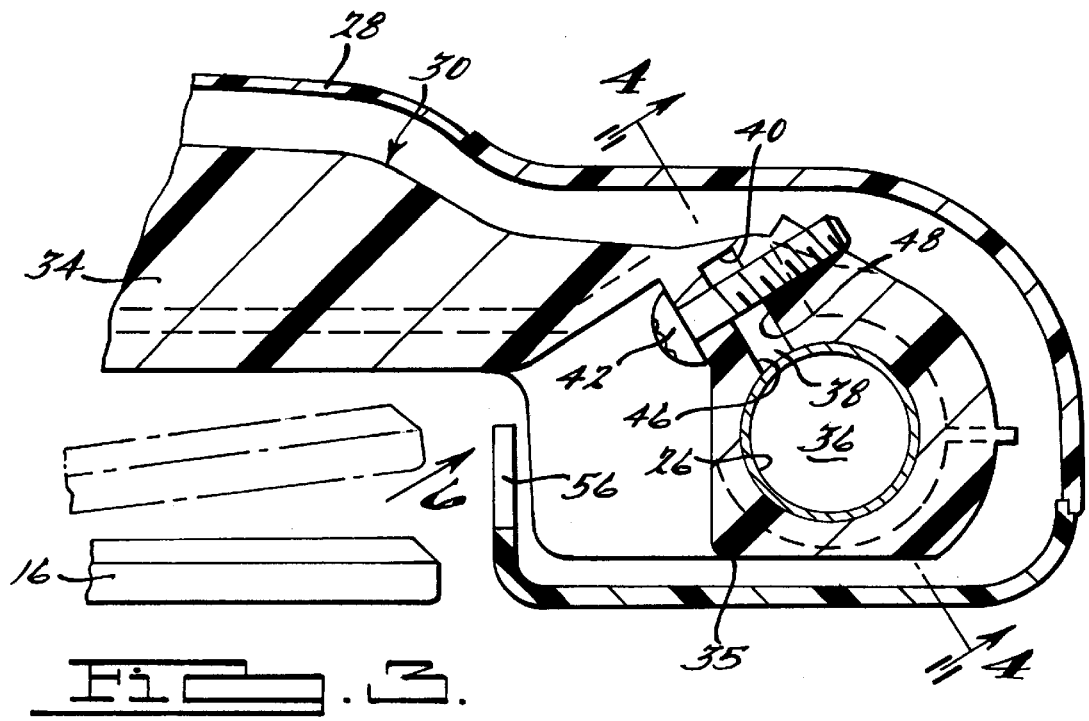
FIG. 3 is a fragmentary view similar to that of FIG. 2 but with the section taken at a location passing through one of the clamping fasteners.

Mirror housing 14 includes an outer casing 28 within which a mirror support frame 30 is disposed. As shown in FIGS. 2 and 3, mirror support frame 30 includes a main body portion 34 which is designed to pivotably support mirror 16 within housing 14 and may incorporate suitable mechanisms by which mirror 16 may be remotely positioned such as for example suitable remotely controlled electric drive motors. Additionally, other mechanisms may also be supported on frame 30 such as for example information display means, means for heating the mirror, etc.

Figure 4:
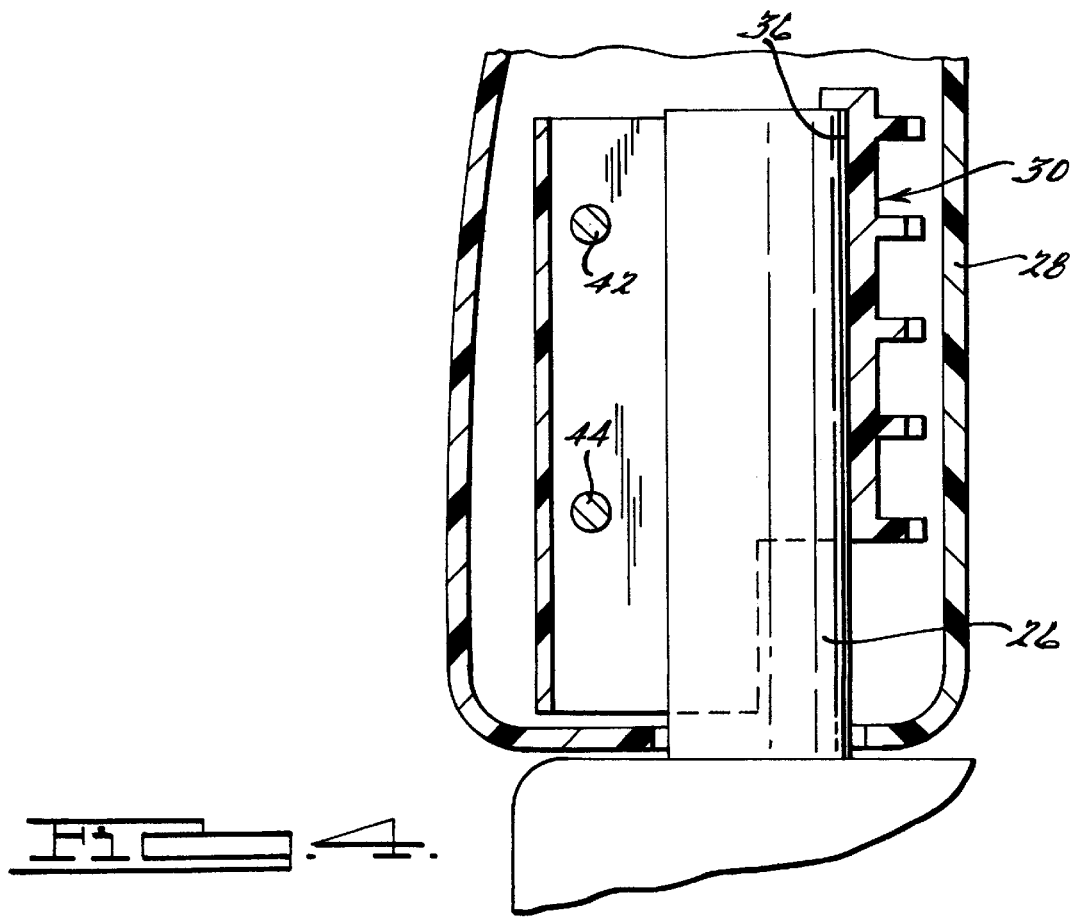
FIG. 4 is a fragmentary section view of the mirror assembly of FIG. 3, the section line being taken along line 4—4 thereof.

Frame 30 also includes a laterally extending mounting portion 35 integrally formed therewith within which is defined an elongated generally cylindrically shaped opening 36 adapted to receive pivot post 26. A slotted opening 38 extends generally radially outwardly from opening 36 and has the outer end thereof closed off by end wall 40. A pair of threaded fasteners 42, 44 extend across slotted opening 38 intermediate its ends and serve to exert a clamping force between opposed sidewalls 46 and 48 thereof A plurality of reinforcing rigidifying ribs 50 are provided on frame 30 wrapping around portion 34 so as to lend sufficient strength thereto while maintaining a relatively lightweight, economical structure. As shown in FIG. 4, end wall 40 is relatively thin in section and does not include any reinforcing ribs extending across the exterior surface thereof. These features enable it to retain sufficient flexibility to accommodate the slight movement of walls 46 and 48 toward each other as fasteners 42 and 44 are tightened while also providing a limiting action limiting tensional forces exerted in the area where walls 46 and 48 join the portion defining cylindrical opening 36. Thus, as fasteners 42 and 44 are tightened the ends of walls 46 and 48 remote from interconnecting end wall 40 will converge thereby reducing the diameter of opening 36 and exerting the desired clamping action on upstanding post 26.

Outer casing 28 provides an aesthetically pleasing smoothly curved shell surrounding frame 30 and includes provisions (not shown) to enable it to be securely fastened to frame 30 in a conventional manner. Casing 28 includes a return flange portion 52 which extends around the periphery of and defines an opening 54 which is sized to accommodate mirror 16. Preferably, flange 52 will be positioned in closely spaced relationship to the peripheral edge of mirror 16 and will extend into the interior area defined by casing 28 sufficiently so as to conceal the interior area from view regardless of the positioning of mirror 16. As best seen with reference to FIGS. 3 and 6, flange 52 of casing 28 includes a pair of spaced cutout portions 56 and 58 which are positioned so as to afford access to respective fasteners 42 and 44 by means of a suitable tool such as screwdriver 60 when mirror 16 is tilted to an extreme inboard position such as is shown in phantom in FIGS. 2 and 3. It should be noted that the positioning of screws 42 and 44 as well as the size of cutout portions 56 and 58 is preferably selected such that the openings defined by cutouts 56 and 58 are substantially concealed from view when mirror 16 is in its normal operative position.

As may now be appreciated, the clamping structure of the present invention is well suited to accommodate convenient service access to the fasteners by which the mirror housing 14 is secured to upstanding post 26 without requiring substantial time consuming disassembly. In order to gain access to the clamping fasteners, all one need do is merely tilt mirror 16 to its extreme inboard position and insert the appropriate tool through the access openings. Not only does this serviceability feature facilitate tightening of the clamping arrangement when and if necessary, but it may also allow removal and replacement of mirror housing 14 without requiring removal of bracket frame 18 from the vehicle should such replacement be desired.

Additionally, the provision of a clamping arrangement which is integrally formed with the mirror support frame offers the advantages of a reduction in the number of parts required to be fabricated, stocked, handled and assembled while still maintaining a secure reliable clamping structure. Further, because this integral clamping structure requires the use of fasteners on only one lateral side thereof, it lends itself to use in providing the serviceability feature discussed above. Preferably, mirror support frame 30 will be manufactured from a suitable polymeric composition having a desired strength and resiliency such as by injection molding. However, it may also be possible to fabricate this component from metal or other suitable material as well. It should be noted that while the embodiment discussed above showed the use of two such fasteners in the clamping arrangement of the present invention, a greater or lesser number of such fasteners may be utilized in differing applications depending upon various factors such as the size of the mirror assembly being secured, the axial length of the mounting force and the maximum desired clamping force.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A breakaway exterior rear view mirror assembly for a motor vehicle comprising:

a bracket frame member adapted to be secured to a motor vehicle, said bracket frame member including a pivot post;

a mirror support frame having a mounting portion receiving said pivot post and a clamp for applying a clamping force to said pivot post whereby said mirror support frame is pivotably secured to said pivot post of said bracket frame member;

a member for adjusting the clamping force exerted on said pivot post by said clamp;

a casing surrounding said mirror support frame and defining an opening therein;

a mirror positioned movably within said opening and supported by said mirror support frame;

said clamping force adjusting member being positioned within said casing such that said adjusting member is accessible through said opening without removal of said mirror.

2. A breakaway exterior rear view mirror assembly as set forth in claim 1 wherein said adjusting member is substantially concealed by said casing and said mirror when said mirror is positioned in a normal operative relationship to said casing.

3. A breakaway exterior rear view mirror assembly as set forth in claim 1 wherein said casing includes a flange portion surrounding said opening, said flange portion including a cutout portion to afford access to said adjusting member.

4. A breakaway exterior rear view mirror assembly as set forth in claim 1 wherein said adjusting member comprises a threaded fastener threadedly engaging said mirror support frame.

5. A breakaway exterior rear view mirror assembly as set forth in claim 1 wherein said clamp is integrally formed with said mirror support frame.

6. A breakaway exterior rear view mirror assembly as set forth in claim 5 wherein said mounting portion includes an elongated pivot post opening formed in said mirror support frame, said pivot post being telescopically received within said pivot post opening.

7. A breakaway exterior rear view mirror assembly as set forth in claim 6 wherein said clamp includes a slotted opening extending generally radially outwardly from said pivot post opening, said slotted opening being defined by first and second spaced opposed wall portions.

8. A breakaway exterior rear view mirror assembly as set forth in claim 7 wherein said clamping force adjusting member extends between said first and second wall portions and operates to draw said wall portions toward each other.

9. A breakaway exterior rear view mirror assembly as set forth in claim 8 wherein said clamping force adjusting member comprises a threaded fastener.

10. A breakaway exterior rear view mirror assembly as set forth in claim 8 further comprising an end wall extending between the radially outer ends of said first and second wall portions.

11. A breakaway exterior rear view mirror assembly as set forth in claim 8 wherein said slotted opening has an axial length coextensive with the axial length of said pivot post opening.

12. A breakaway exterior rear view mirror assembly for a motor vehicle comprising:
   a bracket frame member adapted to be secured to a motor vehicle, said bracket frame including a pivot post;
   a mirror;
   a mirror support frame having a first portion for movably supporting said mirror and a second portion having a cylindrical opening provided therein, said pivot post being telescopically received within said opening; and
   means for reducing the diameter of said cylindrical opening to exert a clamping force on said pivot post to retain said mirror support frame thereon.

13. A breakaway exterior rear view mirror assembly as set forth in claim 12 wherein said diameter reducing means includes a slotted opening defined by first and second opposed spaced sidewalls extending radially outwardly from said cylindrical opening and an adjustment member operative to move said first and second sidewalls toward each other to adjust said clamping force.

14. A breakaway exterior rear view mirror assembly as set forth in claim 13 further comprising an outer casing surrounding at least said second portion of said mirror support frame and defining an opening for receiving said mirror, said adjustment member being accessible through said opening whereby said clamping force may be adjusted without requiring disassembly of said mirror assembly.

15. A breakaway exterior rear view mirror assembly as set forth in claim 14 wherein said adjustment member comprises a threaded fastener extending through one of said first and second sidewalls and threadedly engaging an opening in the other of said first and second sidewalls.

16. A breakaway exterior rear view mirror assembly as set forth in claim 13 further comprising an end wall extending between said first and second sidewalls at the outer end thereof.

17. A breakaway exterior rear view mirror assembly as set forth in claim 13 wherein said slotted opening has a length at least equal to the axial length of said cylindrical opening.

18. A breakaway exterior rear view mirror assembly as set forth in claim 14 wherein said casing includes a flange surrounding said opening, said casing, said flange and said mirror cooperating to substantially conceal said adjustment member when said mirror is in a normal operative position.

19. A breakaway exterior rear view mirror assembly as set forth in claim 18 wherein said casing includes a cutout portion provided in said flange, said mirror being movable to a position in which access to said adjustment member is afforded through said cutout portion.

20. A breakaway exterior rear view mirror assembly as set forth in claim 19 wherein said cutout portion is substantially concealed by said mirror when said mirror is in a normal operative position.

21. An exterior rear view mirror assembly for a motor vehicle comprising:
   a bracket adapted to be secured to a motor vehicle, said bracket including a post;
   a mirror support assembly having a mounting portion cooperating with said post to mount said support assembly on said post;
   an adjustable member operative to exert a force between said mounting portion and said post so as to resist relative movement between said mirror support and said bracket;
   a casing surrounding said mirror support assembly and defining an opening therein;
   a mirror movably positioned within said opening and supported within said casing by said mirror support assembly;
   said adjustable member being positioned within said casing in a location so as to be adjustably accessible through said opening without removal of said mirror.

22. An exterior rear view mirror assembly as set forth in claim 21 wherein said post and said mounting portion include opposed generally cylindrical surfaces, said force being exerted between said surfaces.

23. An exterior rear view mirror assembly as set forth in claim 22 wherein said post and said mounting portion are telescopically interconnected.

24. An exterior rear view mirror assembly as set forth in claim 23 wherein one of said post and said mounting portion include a flange portion operative to limit telescopic movement therebetween.

25. An exterior rear view mirror assembly as set forth in claim 21 wherein said adjustable member is substantially concealed by said casing and said mirror when said mirror is positioned in a normal operative relationship to said casing.

26. An exterior rear view mirror assembly as set forth in claim 25 wherein said casing includes a flange portion surrounding said opening, said flange portion including a cutout portion to afford access to said adjusting member.

27. An exterior rear view mirror assembly as set forth in claim 21 wherein said mirror support assembly is pivotably supported on said post.

28. An exterior rear view mirror assembly as set forth in claim 21 wherein said mounting portion is integrally formed on said mirror support assembly.

29. An exterior rear view mirror assembly as set forth in claim 28 wherein said mirror support assembly is formed from a polymeric composition.

30. An exterior rear view mirror assembly as set forth in claim 29 wherein said mounting portion comprises an elongated cylindrical opening adapted to telescopically receive said post.

31. An exterior rear view mirror assembly as set forth in claim 30 further comprising a slot extending generally radially outwardly from said opening, said adjustable member being operative to reduce the diameter of said opening.

32. An exterior rear view mirror assembly as set forth in claim 30 further comprising a plurality of generally radially outwardly extending axially spaced reinforcing flanges extending circumferentially around at least a portion of said opening.

33. An exterior rear view mirror assembly as set forth in claim 30 further comprising a circumferentially extending radially inwardly projecting flange portion provided at one end of said generally cylindrical opening, said flange portion being operative to limit telescopic movement of said post through said opening.

34. A breakaway exterior rear view mirror assembly for a motor vehicle comprising:
   a bracket frame member adapted to be secured to a portion of a motor vehicle, said bracket frame member including an upstanding pivot post provided thereon;
   a mirror support frame having a main body portion and a mounting portion extending laterally outwardly from said main body portion, said mounting portion defining a generally cylindrically shaped elongated opening telescopically receiving said pivot post and a slotted opening extending generally radially outwardly from said generally cylindrical opening, said slot being defined by first and second spaced opposed wall portions;

a member extending between said first and second opposed wall portions, said member being operative to adjustably vary the spacing between said first and second opposed wall portions whereby a clamping force may be exerted on said pivot post by said mounting portion;

a casing surrounding said mirror support frame and defining an opening therein;

a mirror movably supported on said main body portion of said mirror support frame, said mirror substantially filling said opening defined by said casing;

said member being positioned within said casing such that said member may be accessed for adjustment through said opening without removing said mirror.

35. A breakaway exterior rear view mirror assembly as set forth in claim 34 wherein said casing includes a flange portion extending inwardly around the periphery of said opening, said flange portion including a cutout portion to afford access to said member.

36. A breakaway exterior rear view mirror assembly as set forth in claim 34 wherein said member is a threaded fastener.

37. A breakaway exterior rear view mirror assembly as set forth in claim 34 wherein said mounting portion includes a plurality of axially spaced radially outwardly and circumferentially extending reinforcing flanges.

38. A breakaway exterior rear view mirror assembly as set forth in claim 34 wherein said mounting portion includes a flange portion at one end thereof extending radially inwardly with respect to said opening, said flange being operative to limit telescopic movement of said pivot post.

39. A breakaway exterior rear view mirror assembly as set forth in claim 34 wherein said mirror support frame is integrally formed from a polymeric composition.

40. A breakaway exterior rear view mirror assembly for a motor vehicle comprising:

a bracket frame member adapted to be secured to a motor vehicle;

a mirror;

a mirror support frame having a first portion for movably supporting said mirror and a second portion;

one of said bracket and said second portion of said mirror support frame having a pivot post provided thereon and the other of said bracket and said second portion of said mirror support frame having a cylindrical opening telescopically receiving said pivot post; and means for reducing the diameter of said cylindrical opening to exert a clamping force on said pivot post to retain said mirror support frame and said bracket frame together.

\* \* \* \* \*